United States Patent [19]
Ujiie

[11] 3,737,616
[45] June 5, 1973

[54] APPARATUS FOR MANUFACTURING SPHERICAL METALLIC VESSELS OR HEMISPHERICAL VESSEL HEADS

[75] Inventor: Akira Ujiie, Kobe-shi, Japan

[73] Assignee: Mitsubishi Jukogyo Kabushiki Kaisha, Tokyo, Japan

[22] Filed: Apr. 2, 1971

[21] Appl. No.: 130,765

Related U.S. Application Data

[62] Division of Ser. No. 22,772, March 26, 1970, abandoned.

[30] Foreign Application Priority Data

Mar. 28, 1969    Japan ................................ 44/21340

[52] U.S. Cl. .................................. 219/76, 219/60 A
[51] Int. Cl. .............................................. B23k 9/04
[58] Field of Search ....................... 219/76, 117, 61, 219/60.1, 73

[56] References Cited

UNITED STATES PATENTS

| | | | |
|---|---|---|---|
| 3,558,846 | 1/1971 | Ujiie | 219/76 |
| 3,569,658 | 3/1971 | Moore | 219/76 |
| 3,483,353 | 12/1969 | Braucht | 219/76 |

*Primary Examiner*—J. V. Truhe
*Assistant Examiner*—B. A. Reynolds
*Attorney*—John J. McGlew and Alfred E. Page

[57] ABSTRACT

A spherical container or a hemispherical head for a pressure vessel, is formed integrally of deposited weld metal. A first turntable is rotatable about a substantially horizontal axis which constitutes one diameter of the sphere, and a second turntable is rotatable about a substantially vertical axis which constitutes another diameter of the sphere perpendicular to the first diameter. A small spherical metallic segment constitutes a starting piece, and has a wall thickness equal to that of the vessel to be formed, the segment forming the base of a solid central angle of the sphere. The segment has a tapered step extending completely around its peripheral edge and having a maximum height equal to the thickness of a layer of weld metal to be deposited and a minimum height equal to zero, thus forming an abrupt step. The segment is mounted on the first turntable for symmetrical rotation about the first diameter of the sphere. The second turntable supports an electro-slag welding apparatus for revolution about the mentioned vertical axis, and a channel-shape copper block is also mounted for revolution about the vertical axis and is arranged to embrace the periphery of the segment, this block forming a backing bar for the deposited weld metal and flux. The weld metal is progressively deposited along the peripheral edge of the segment in the form of a continuous strip comprised of superposed convolutions whose width is substantially equal to the wall thickness of the vessel to be formed and whose thickness is substantially equal to that of the step. The rate of rotation of the segment is coordinated with the rate of deposition of weld metal, and the rate of revolution of the welding apparatus and of the backing bar is coordinated with the progressive change in diameter of the vessel being formed by the deposited weld metal.

4 Claims, 4 Drawing Figures

PATENTED JUN 5 1973 3,737,616

3,737,616

APPARATUS FOR MANUFACTURING SPHERICAL METALLIC VESSELS OR HEMISPHERICAL VESSEL HEADS

This is a division of application Ser. No. 22,772, filed Mar. 26, 1970, now abandoned.

BACKGROUND OF THE INVENTION

In the conventional manufacture of spherical metallic vessels, two hemispherical metallic members, which have either been preformed as single pieces or have been formed by joining spherical-shaped sectors, segments and the like, are joined to form the spherical vessel. In manufacturing large-size spherical vessels, the spherical shells are divided into relatively small pieces which are then pressed into the required spherical form and joined together, as by welding.

In these conventional procedures, relatively massive dies are required for bending plates, in bending presses, or by explosive formation, with the plates subsequently being welded to each other. Consequently, these conventional procedures are costly and have disadvantages such as the increase in welding costs with the number of parts to be weld united, and the difficulty in controlling distortion. In addition, extensive use of high tension steel and other special steels, in recent years, has increased the difficulty of press-forming blank plates into spherical form.

SUMMARY OF THE INVENTION

This invention relates to the manufacture of metallic vessels whose form constitutes at least a part of a sphere and, more particularly, to an improved apparatus for forming such vessels in one piece substantially entirely by weld metal deposition.

The invention is based on the concept that it is possible to cover the entire surface of a spherical shell by means of a rope having a certain cross-sectional area, by dangling the rope from a vertex on the spherical shell and then swirling the rope. Based upon this concept, a spherical metallic structure is formed, with a vertex or pole thereof taken as a center, by replacing a unit volume of the rope with successively deposited weldmetal.

The present invention is very effective in manufacturing spherical pressure vessels, such as pressure vessels for use in petroleum refining, pressure vessels for chemical use, hemispherical ends for cylindrical pressure vessels for use in the atomic energy industry, superhigh pressure vessels for the atomic energy industry, and pressure vessels to be subjected to high external pressure, such as deep sea structures, or the like.

In accordance with the invention, a small spherical metallic segment is rotated about a horizontal axis, as by being mounted symmetrically on a turntable, while progressively depositing a continuous strip of weld metal along the peripheral edge of the segment and in the form of superposed convolutions whose width is substantially equal to the wall thickness of the vessel to be formed. The rate of rotation is coordinated with the rate of weld metal deposition to maintain a substantially uniform thickness of the deposited strip of weld metal. The point of weld metal deposit is revolved about an axis perpendicular to the axis of rotation of the segment, and at a rate coordinated with the progressive change in diameter of the vessel being formed.

Preferably, the periphery of the segment is formed with a tapered step portion extending completely therearound and having a maximum height equal to the thickness of the deposited strip of weld metal and a minimum height which is zero, the maximum and minimum heights coinciding to form a relatively abrupt step. A channel-shape backing bar or strip embraces the periphery of the segment to receive the deposited weld metal and flux, the weld deposition being effected by electro-slag welding apparatus which is revolved at a rate coordinated with the progressive change in diameter of the vessel being formed.

An object of the invention is to provide an improved and simplified apparatus for forming integral or one-piece metallic vessels whose form constitutes at least a part of a sphere.

A further object of the invention is to provide such an apparatus utilizing, as a starting piece for the vessel, a small spherical metallic segment forming the base of a solid central angle of the sphere and having a wall thickness equal to that of the vessel to be formed.

Another object of the invention is to provide such an apparatus in which such segment is rotated about an axis of symmetry which is a diameter of the sphere.

A further object of the invention is to provide such an apparatus in which, during rotation of the segment, a continuous strip of weld metal is progressively deposited along the peripheral edge of the segment in the form of superposed convolutions.

Another object of the invention is to provide such an apparatus in which the rate of rotation of the segment is coordinated with the rate of weld metal deposition to maintain a substantially uniform thickness of the deposited strip of weld metal.

A further object of the invention is to provide such an apparatus in which the point of weld metal deposition is revolved about an axis perpendicular to the axis of rotation of the segment and at a rate coordinated with the progressive change in diameter of the vessel being formed.

For an understanding of the principles of the invention, reference is made to the following description of a typical embodiment thereof as illustrated in the accompanying drawings.

DESCRIPTION OF THE PREFERRED EMBODIMENT

Figure 1:
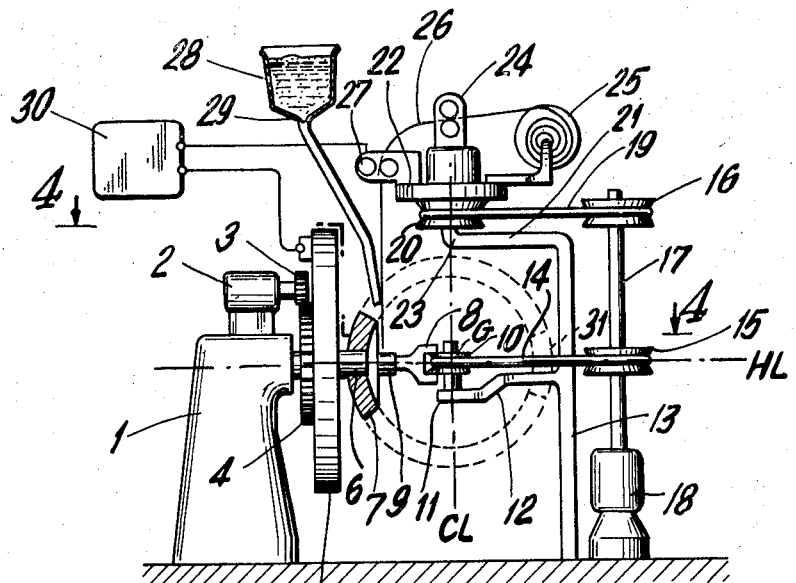
FIG. 1 is a front elevation view, partly in section and partly schematic, illustrating apparatus embodying the invention.
Figure 4:
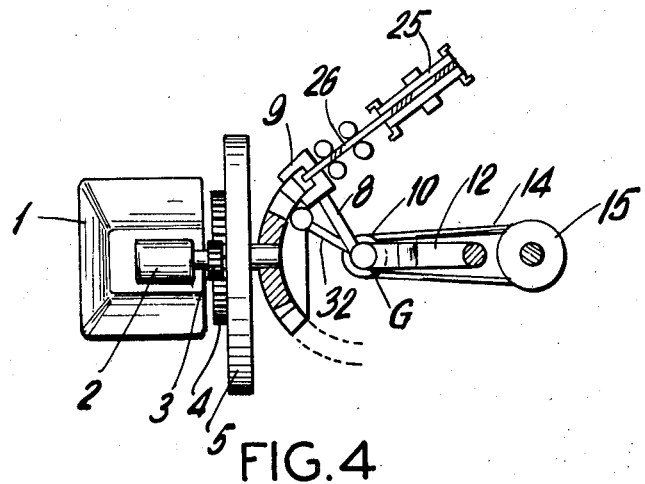
FIG. 4 is a top plan view of the apparatus shown in FIG. 1 taken on the line 4—4 thereof.

Referring first to FIGS. 1 and 4, a supporting base 1 supports a drive motor 2 driving a pinion 3 meshing with a drive gear 4 secured to a turntable 5, gear 4 and table 5 being rotatable about a substantially horizontal axis which constitutes a diameter HL of a sphere.

The parts used in the method and apparatus of the invention include a pre-formed work piece 7 in the form of a small spherical metallic segment forming the base of the solid central angle of the sphere and whose apex is at the center of the sphere, the work piece 7 having a wall thickness equal to that of the vessel to be formed. The apparatus further includes means for rotating work piece 7 about the horizontal axis HL, and including base 1, motor 2, pinion 3, gear 4 and turntable 5. In addition, the apparatus includes a means for forming substantially the entire surface of a spherical volume bounded by a spherical shell, with deposited weld metal "wound" in a swirl from a vertex or pole of the spherical shell.

Figure 2:
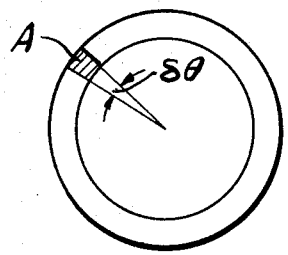
FIG. 2 is a somewhat schematic plan view for explaining the principles of the invention.
Figure 3:
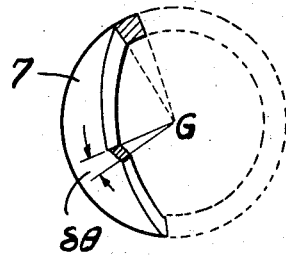
FIG. 3 is a perspective view of a vessel produced by the apparatus of the invention, during the course of production.

The starting piece 7, which is shown in FIG. 3 in perspective form, is mounted on turntable 5 by a bolt 6. The weld metal is deposited onto starting piece 7 as if the weld metal were a rope having a cross section A defined by the spherical angle $\delta\theta$, as represented by the shaded portion in explanatory FIG. 2.

With respect to the construction of the apparatus, the apparatus comprises three elements constituted by the quadrants formed by the vertical axis CL and the horizontal axis HL, both of which intersect the center G of a sphere of which the vessel to be formed constitutes at least a part. One of these three elements is a weld deposit forming mechanism including a pulley 10 on which is secured, for rotation with the pulley, an arm 8 having a length substantially equal to the inner diameter of the sphere, pulley 10 rotating arm 8 through substantially 180° around the center G in order to rotate a weld backing or strap member 9 about center G. This mechanism extends from the exterior through an opening 31 diametrically opposite the bolt 6, and pulley 10 is rotatably supported on supporting members 11 and 12 in turn fixably supported by an upright shaft 13. Pulley 10 is rotated by means of a belt 14 extending through hole 31 and rotated by a pulley 15 secured to a shaft 17, outside the sphere, with shaft 17 being rotated by a motor 18.

Another element comprises a turntable 22, to which is secured a pulley 20, turntable 22 being rotatable about a vertical axis which is the diameter CL, and being supported above the work piece by a lateral arm 21 of upright or shaft 13, arm 21 terminating in an upwardly directed end 23 which forms the bearing for rotation of turntable 22. Turntable 22 supports feeding rollers 24 for the welding rod or wire 26 which is withdrawn from a reel 25 also supported on turntable 22. Welding current is supplied to welding rod or wire 26 by current contact shoe means 27 connected to one terminal of a welding power supply 30, another terminal of power supply 30 being connected to turntable 5.

Welding flux is supplied to backing member 9 by a conduit 29 leading from a flux hopper 28. A belt 19 connects pulley 20 for driving by a pulley 16 secured to the shaft 17, so that turntable 22 is rotated in synchronism with arm 8.

The manner of operation of the apparatus will now be described. A blank 7, which can also be termed a "starting block," is formed in the shape of a spherical segment, as best seen in FIG. 3. Blank 7 may either be formed from deposited weld metal or may be machined from a steel plate which has been pressed into the shape of a small spherical segment. The peripheral edge of blank or starting block 7 is tapered through 360° from the upper edge of a stepped portion or step having the cross sectional area indicated at A in FIG. 2. At its maximum height, the cross sectional area A of the tapered portion has an angular extent $\delta\theta$ and at a point 180° from its maximum height, the area A has an angular extent of one half $\delta\theta$ and, at the terminal or 360° point, the area A has an angular extent of zero. In effect, the peripheral edge of blank 7 is provided with a wedge extending through 360°.

To start the operation of forming the spherical body, starting block 7 is mounted on turntable 5 by means of bolt 6, with the step A being horizontally oriented. Flux is fed from hopper 28 to conduit 29 into the substantially box-shaped receiver formed by step A, the channel-shape strap or backing member 9, and the cross section of starting block 7. Welding rod 26 is inserted into the flux, being fed by rollers 24 past the current contact jaws 27, which latter may be in the form of guide rollers. When a potential is applied between welding rod 26 and turntable 5, metallically connected to starting block 7, an electro-slag welding procedure is initiated and the mentioned box-shape receiver is filled with deposited weld metal. At the same time, the welding current penetrates into the step A and into the cross section of starting block 7.

Motor 2 is then energized to rotate turntable 5, through gears 3 and 4, at an angular velocity such that the peripheral speed of blank 7 is coordinated with the rate of weld metal deposition along the periphery of starting block 7. The peripheral speed is maintained constant even with increasing diameter of the vessel being formed, and is determined by the thickness of the continuous strip of deposited weld metal which, in turn, is equal to the "height" of step A.

Simulatenously, motor 18 is energized to rotate arm 8 and turntable 22 about the axis CL extending through the center G the rate of rotation effected by motor 18 is coordinated with the progressive change in diameter of the vessel being formed.

Thus, as the welding proceeds with the size of the spherical vessel increasing, the back-up member 9 is maintained always in contact with the periphery of the vessel, it being noted that after one complete revolution of the weld backing member 9 is in contact with the deposited continuous strip of weld metal. Furthermore, and due to rotation of turntable 22, the welding flux is always supplied to the welding point despite the increasing diameter or size of the vessel being formed.

Thus, by utilizing the apparatus of the invention, an integral or unitary spherical vessel is formed by depositing weld metal to surround the volume of a sphere in the manner of a "swirl." The manner of depositing weld metal is analogous to the swirling of a rope having the cross sectional area A, although the swirling of a rope would merely define a hollow space whereas the deposit of weld metal forms a solid body.

In the final stage, the welding operation is terminated just before arm 8 completes a 180° rotation in a horizontal plane including the diameter HL. The opening 31 is left unfinished, so that the components of the welding apparatus can be withdrawn through this opening. In order that opening 31 be as small as possible, the components of the welding apparatus which are disposed inside the sphere are designed for disassembly for withdrawal. After withdrawal of these components through opening 31, a nozzle, a cover or the like may be inserted into opening 31 and welded to the remainder of the vessel to complete the formation of the vessel.

If an arm 32 is positioned behind arm 8, as shown in FIG. 4, and supports grinding means at its free end, finishing of the interior of the sphere can be effected simultaneously with the formation of the sphere by depositing weld metal.

From the foregoing, it will be noted that the invention has advantages such as eliminating bending operations, heating operations required for the bending operations, machining for edge preparation, which latter is very difficult to accomplish by a machine tool in the case of spherical elements so that manual machining usually is used, which increases the manufacturing cost, and other advantages. In addition, thick plates are not required to form the spherical vessel so that spherical vessels having thick walls can be manufactured substantially in one piece by using welding rods having the cross sectional area of thin plates such as, for example, flat elongated bars having a rectangular or polygonal cross section. Thereby, not only is there a reduction in the manufacturing cost but also spherical vessels of uniform and excellent quality can be manufactured by using only deposited weld metal, through the application of the re-melt procedure which is the equivalent of vacuum melting, as in the case of slag melting. The accuracy of sphericity of the formed vessels is very high. Furthermore, vessels of different sizes can be manufactured using the same apparatus and merely changing the size of the backing bar 9 and interchanging the several jigs, such as the arm 8 and the like. In addition, if the operation is stopped at the equator, thus forming only half a sphere, the method is applicable to the formation of hemispherical ends for pressure vessels.

While a specific embodiment of the invention has been described in detail to illustrate the application of the principles of the invention, it will be understood that the invention may be embodied otherwise without departing from such principles.

What is claimed is:

1. Apparatus for manufacturing metallic vessels whose form constitutes at least a part of a sphere, said apparatus comprising, in combination, a small spherical metallic segment, forming the base of a solid central angle of the sphere and whose apex is at the center of the sphere having a thickness substantially equal to that of the vessel to be formed; means supporting said segment for rotation about an axis of symmetry which is a diameter of the sphere of which the vessel forms at least a part; first driving means operable to rotate said support; a second support; an arm rotatably mounted on said second support for rotation about an axis which is perpendicular to said axis of symmetry and which forms a diameter of the sphere of which the vessel forms at least a part, said arm having a length equal to the radius of said metallic segment; a weld back up member supported at the free end of said arm in engagement with the periphery of said metallic segment; second driving means operable to rotate said arm; a welding material feed mechanism mounted on said second support for revolution about the axis of rotation of said arm, said mechanism being operable to supply molten weld metal to said backing member to deposit a continuous strip of weld metal along the peripheral edge of said segment as said support is rotated by said first driving means; said first driving means rotating said segment at an angular velocity coordinated with the rate of weld metal deposition to maintain a substantially uniform thickness of the deposited strip of weld metal, and said second driving means revolving said backing member and said mechanism at a rate coordinated with the progressive change in diameter of the vessel being formed.

2. Apparatus for manufacturing metallic vessels, as claimed in claim 1, in which said metallic segment has a tapering peripheral edge extending through 360°, from the upper edge of a step, having a height substantially equal to the thickness of the strip of weld metal to be deposited, to the lower edge of said step.

3. Apparatus for manufacturing metallic vessels, as claimed in claim 2, including a second arm rotatably mounted on said second support and in fixed angular trailing relation to said first-mentioned arm; and machining means mounted on the free end of said second arm and operable to progressively machine the interior surface of the vessel as it is formed by weld metal deposition.

4. Apparatus for manufacturing metallic vessels, as claimed in claim 2, in which said welding material feed mechanism is an electro-slag welding apparatus feeding flux and a continuous welding rod to said backing member.

* * * * *